(12) United States Patent  
Gu et al.

(10) Patent No.: US 8,537,734 B2
(45) Date of Patent: Sep. 17, 2013

(54) METHOD AND ARRANGEMENT FOR SAVING RADIO RESOURCES BY DETERMINING POWER OFFSET VALUES IN THE USER EQUIPMENT

(75) Inventors: Xinyu Gu, Beijing (CN); Hai Wang, Beijing (CN); Qingyu Miao, Beijing (CN); Fredrik Gunnarsson, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 470 days.

(21) Appl. No.: 12/812,247

(22) PCT Filed: Jan. 10, 2008

(86) PCT No.: PCT/SE2008/050025
§ 371 (c)(1),
(2), (4) Date: Jul. 9, 2010

(87) PCT Pub. No.: WO2009/088330
PCT Pub. Date: Jul. 16, 2009

(65) Prior Publication Data
US 2010/0290381 A1  Nov. 18, 2010

(51) Int. Cl.
*G08C 17/00* (2006.01)
(52) U.S. Cl.
USPC ..................... 370/311; 455/343.2

(58) Field of Classification Search
None
See application file for complete search history.

(56) References Cited

U.S. PATENT DOCUMENTS

| 2002/0077138 A1* | 6/2002 | Bark et al. ............ 455/522 |
| 2004/0203426 A1* | 10/2004 | Cave et al. ............ 455/67.11 |
| 2006/0171451 A1* | 8/2006 | Pietraski et al. ........ 375/232 |
| 2007/0298822 A1* | 12/2007 | Wan et al. ............. 455/509 |

FOREIGN PATENT DOCUMENTS

| WO | WO 02/39623 A1 | 5/2002 |
| WO | WO 2008/110104 A1 | 9/2008 |

* cited by examiner

*Primary Examiner* — Jianye Wu
(74) *Attorney, Agent, or Firm* — Roger S. Burleigh

(57) ABSTRACT

The present invention relates to an arrangement and a method in a user equipment of saving radio resources in a communication network system comprising a communication network node (15) communicating withto one or more user equipments (18) on uplink (17) and downlink (16) data channels over a radio interface, whereby a transmission power 5 value on said uplink data channel (17) is determined by adding a power offset value to a pre-determined reference power value. A carrier-to-interference (C/I) value on said uplink data channel (17) is determined and said power offset value is then determined based on said determined carrier-to-interference value, whereby said power offset value is determined in said user equipment (18) instead of being received over said radio interface 10 from said communication network node (15).

24 Claims, 4 Drawing Sheets

METHOD AND ARRANGEMENT FOR SAVING RADIO RESOURCES BY DETERMINING POWER OFFSET VALUES IN THE USER EQUIPMENT

TECHNICAL FIELD

The present invention relates to a method and an arrangement in a communication network system and, more particular, to arrangements allowing for saving radio resources as well as a method for such saving.

BACKGROUND

In an uplink from a user equipment to a radio base station, the transmission powers of different uplink channels usually are set relative to a reference channel, for example in Wideband Code Division Multiple Access (WCDMA) the Dedicated Physical Control Channel (DPCCH). The power difference relative to the reference channel is called power offset.

Suppose the power needed for the data channel is $Power_{data}$ in the decibel scale, and the power of the reference control channel is $Power_{refe}$ in the decibel scale, the relationship between them may be expressed as:

$$Power_{data} = Power_{refe} + \Delta_{data} \qquad (1)$$

In the above function, $\Delta_{data}$ is the power offset relative to the power of the reference channel.

Depending on the amount of data to be transmitted on the data channel, the transport format is different, which specifies the parameters used in transmission, for example, the modulation type, the spreading factor, the number of channelization codes and the channel coding rate. For different transport format, to get the desired transmission error performance, for example, Block Error Rate (BLER), the required power is different. Therefore, the power offset depends on the transport format used on the data channel. And usually there is a table to describe the relationship between the transport format and the required power offset.

The Node B and the UE both need to know this table for scheduling and transport format selection and etc. Currently, the table is signalled to the UE. When the number of transport formats is large, signalling the whole table requires large signalling overhead. Therefore, usually, only several transport formats are selected as reference transport formats, and their power offsets are signalled to the UE. For other non-reference transport formats, their power offsets need to be calculated by interpolation based on the signalled power offsets of the reference transport formats, for example, in Enhanced Uplink. The power offsets of these reference transport formats are obtained by link-level simulation.

There are some problems for the current solution, however. Firstly, signalling overhead is needed. Secondly, even only signalling reference values which may save some signalling overhead, it is hard to ensure the accuracy of the power offset values for the below reasons:

The power offset obtained by link-level simulation may not accurate, where only a typical set of simulation parameters is assumed. (For example TU3 or RA50);
The interpolation to calculate the non-reference power offset values may introduce errors;
In order to save signalling overhead, the signalled power offset values need to be quantized, which may introduce quantization errors.

SUMMARY

Accordingly, one objective with the present invention is to provide an improved method in a user equipment of saving radio resources in a communication network system comprising a communication network node transmitting data to one or more user equipments on uplink and downlink data channels over a radio interface, whereby a transmission power value on said uplink data channel is determined by adding a power offset value to a pre-determined reference power value.

According to a first aspect of the present invention this objective is achieved through a method as defined in the characterising portion of claim 1, which specifies that radio resources is saved by a method which performs the steps of determining a carrier-to-interference (C/I) value on said uplink data channel and determining said power offset value based on said determined carrier-to-interference value, whereby said power offset value is determined in said user equipment instead of being received over said radio interface from said communication network node.

A further objective of the present invention is to provide an improved arrangement in a user equipment of saving radio resources in a communication network system comprising a communication network node transmitting data to one or more user equipments on uplink and downlink data channels over a radio interface, whereby a transmission power value on said uplink data channel is determined by adding a power offset value to a pre-determined reference power value.

According to a second aspect of the present invention this further objective is achieved through an arrangement as defined in the characterising portion of claim 6, which specifies that radio resources is saved by an arrangement which comprises means for determining a carrier-to-interference (C/I) value on said uplink data channel and means for determining said power offset value based on said determined carrier-to-interference value, whereby said power offset value is determined in said user equipment instead of being received over said radio interface from said communication network node.

Further embodiments are listed in the dependent claims.

Thanks to the provision of a method and arrangement, which enable the UE to calculate power offsets by itself, signalling overhead is saved and more accurate power offset values are provided since there is no loss during the signalling (quantization and interpolation from reference values.). The calculation of the power offset is done through simple interpolations.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
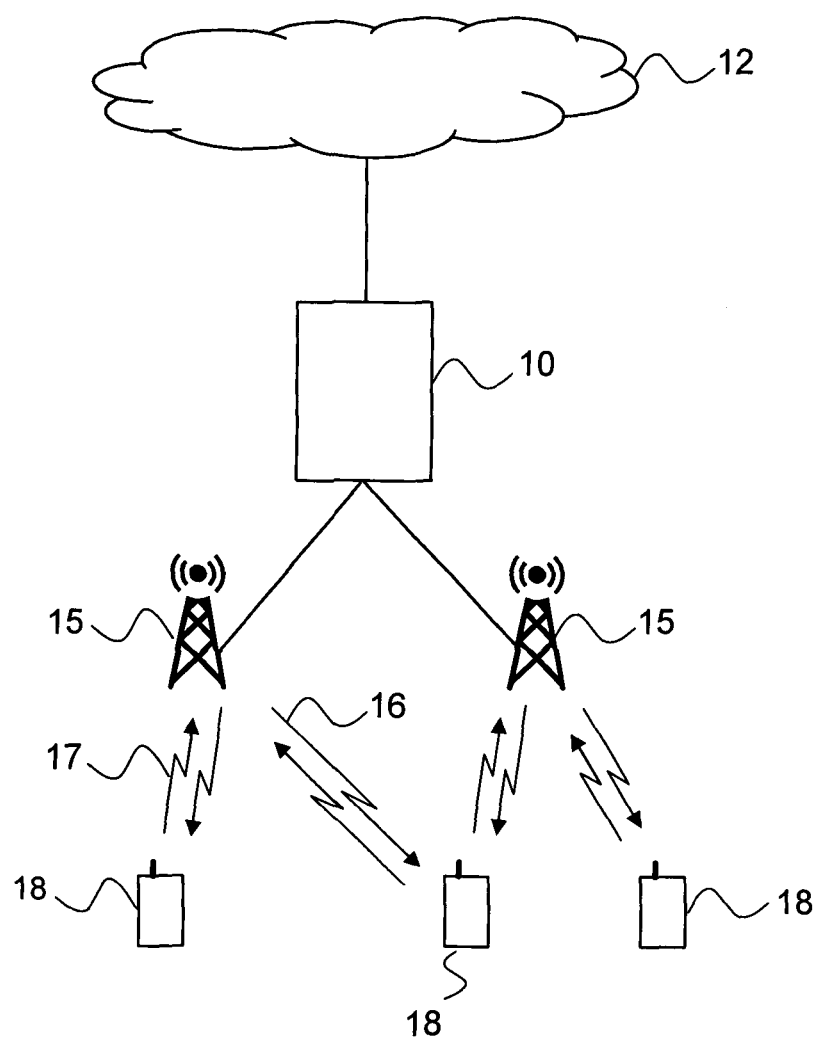
FIG. 1 shows a communication network architecture according to the present invention.

FIG. 1 depicts a communication system including a Radio Access Network (RAN), such as the UMTS Terrestrial Radio Access Network (UTRAN) architecture, comprising at least one Radio Base Station (RBS) (eNode B or Node B) 15 (two are shown in FIG. 1) connected to one or more Radio Network Controllers (RNCs) 10. The RAN is connected to a Core network (CN) 12. The RAN and the CN 12 provide communication and control for a plurality of user equipments (UE) 18 that each uses downlink (DL) channels 16 and uplink (UL) channels 17. For the reason of clarity, only one uplink channel is denoted 17 and one downlink channel denoted 16. On the downlink channel 16, the RBS 15 transmits to each user equipment 18 at respective power level. On the uplink channel 17, the user equipments 18 transmit data to the RBS 15 at respective power level.

According to a preferred embodiment of the present invention, the communication system is herein described as a WCDMA communication system. The skilled person, however, realizes that the inventive method and arrangement works very well on other packet based communications systems as well, such as a Long Term Evolution (LTE) system. The user equipments 18 may be mobile stations such as mobile telephones ("cellular" telephones) and laptops with mobile termination and thus may be, for example, portable, pocket, hand-held, computer-included or car-mounted mobile devices which communicate voice and/or data with the RAN.

On the uplink channels 17 from the user equipment 18 to the RBS 15, the transmission powers of different uplink channels usually are set relative to a reference channel. As stated above, the power offset describes the required power difference between the data channel and reference control channel. It may also be expressed as the difference of the required Carrier to Interference (C/I) (in the decibel scale) of these channels to get the desired BLock Error Rate (BLER) targets.

$$C/I_{data} = C/I_{refe} + \Delta_{data} \quad (2)$$

Therefore, the key point to calculate power offset $\Delta_{data}$, is to get the C/I of the data channel (depends on the transport format used on the channel) and the reference control channel.

The C/I of the reference control channel, for example DPCCH, is determined by the error rate requirement of the information transmitted on it. Take DPCCH as an example, the required C/I is mainly determined by the bit error rate requirement of TPC (Transmit Power Control) bits transmitted on DPCCH. The determination of the C/I of the reference control channel is not within the scope of this invention. And the value needs to be signalled to the UE.

The present invention is mainly focused on the calculation of the C/I of the data channel.

There are two types of lookup tables in a previously known decoder model. One is Signal to Interferens-plus-Noise Ratio (SINR) vs. normalized channel capacity (herein called Received coded Bit Information Rate (RBIR)), which depends on the modulation type. The other is RBIR vs. BLER, which depends on the channel coding type, code rate and/or code block length.

Figure 2:
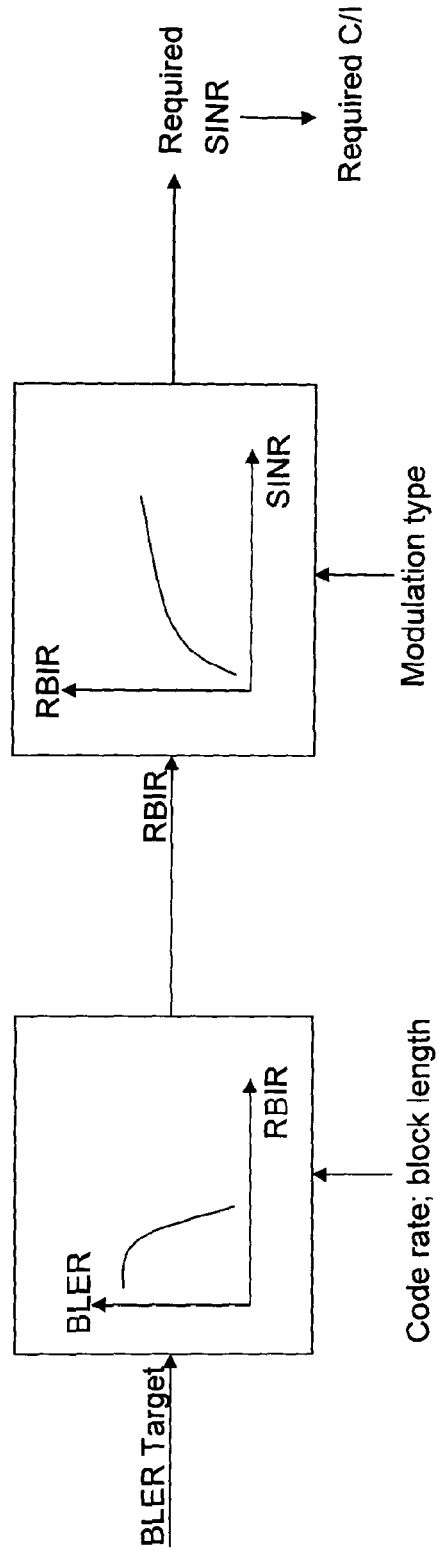
FIG. 2 illustrates a method to get the required C/I.

Given the transport format information, the required C/I may be calculated through two interpolations as shown in FIG. 2. Using the code rate and the block length as index, a required RBIR value is found in a RBIR-to-BLER table when starting with a BLER target value. The obtained RBIR value is then used in a SINR-to-RBIR table to obtain a required SINR value using the modulation type as index. The C/I value is calculated with equation (3) described below.

The present inventive method may also take the Hybrid Automatic-Repeat-Request (HARQ) operating point into view when calculating the power offset, for example, suppose the HARQ scheme is Chase Combining, the detailed method for computing the required C/I is as below:

Step 1: Decide the HARQ operating point. If M HARQ transmissions are allowed, the HARQ target perhaps will be set to M transmissions with 10% residual BLER (or 1% residual BLER, etc.).

Step 2: Find the required RBIR according to the target residual BLER by looking up the RBIR-to-BLER table with the code rate and information bits length as index.

Step 3: Find the required SINR according to the RBIR obtained by step 2 by looking up the SINR-to-BLER table.

Step 4: Convert SINR (in the linear scale) to C/I (in the linear scale) per transmission according to:

$$C/I = \frac{SINR}{M \cdot SF} \quad (3)$$

where SF is the spreading factor.

The power offset for each transport format may then be calculated easily by (2).

Figure 3:
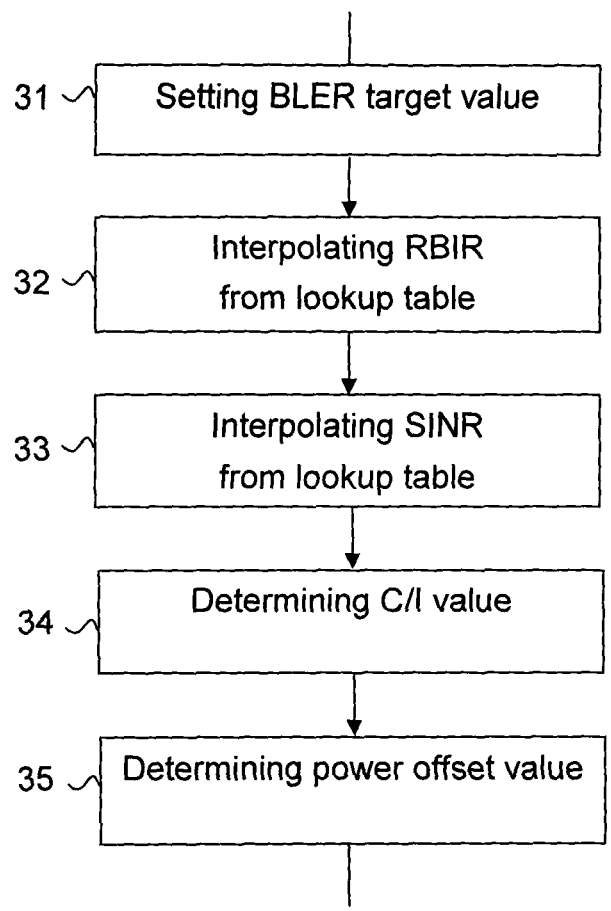
FIG. 3 is a flowchart illustrating the inventive method in a user equipment.

The general procedure in a user equipment of saving radio resources in a communication network system comprising a communication network node, such as a RBS, communicating with one or more user equipments on uplink and downlink data channels over a radio interface, whereby a transmission power value on said uplink data channel is determined by adding a power offset value to a pre-determined reference power value, shown in FIG. 3 is as follows:

setting a BLER target value (step 31), optionally, by deciding a HARQ operating point;

interpolating a received coded bit information rate (RBIR) value from a first lookup table (step 32), i.e. the RBIR-to-BLER table using the code rate and block length as index;

interpolating a signal to interference plus noise rate (SINR) value using said interpolated received coded bit information rate (RBIR) value from step 32 in a second lookup table (step 33), i.e. the SINR-to-BLER table;

determining a carrier-to-interference (C/I) value on said uplink data channel (step 34) by converting said interpolated signal to interference plus noise rate (SINR) value to said carrier-to-interference (C/I) value as described above;

determining said power offset value based on said determined carrier-to-interference value (step 35), whereby said power offset value is determined in said user equipment instead of being received over said radio interface from said communication network node.

Figure 4:
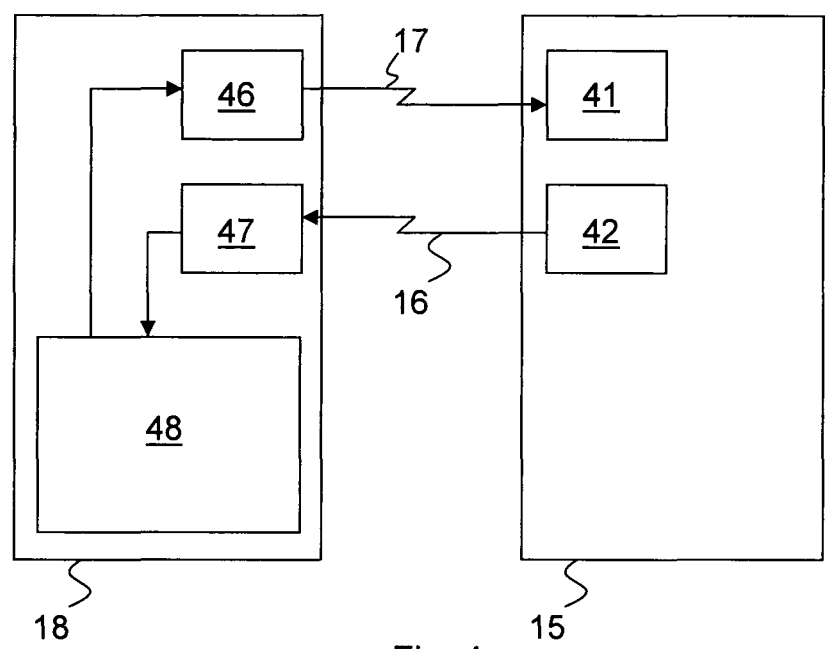
FIG. 4 is a simplified block diagram of an inventive user equipment and radio base station.

FIG. 4 is a block diagram showing a user equipment 18 and a radio base station (RBS) 15, such as Node B, for saving radio resources in a communication network system, comprising the RBS 15 communicating with one or more user equipments 18 on uplink 17 and downlink 16 data channels over a radio interface. The RBS 15 comprises a radio transmitter 42 and a receiver 41. The transmitter 42 is transmitting data to a receiver 47 of the user equipment 18 over the radio interface on the downlink channel 16. The receiver 41 is receiving data from the user equipment 18 on the uplink channel 17.

The user equipment 18 comprises a radio transmitter 46 arranged to transmit data packets to the receiver 41 of the RBS 15 over the radio interface on the uplink channel 17 and a receiver 47 arranged to receive data packets transmitted from the transmitter 42 of the RBS 15 on the downlink channel 16. The user equipment 18 further comprises means 48 for determining a carrier-to-interference (C/I) value on the uplink data channel 17 and for determining said power offset value based on said determined carrier-to-interference value, whereby said power offset value is determined in said user equipment instead of being received over said radio interface from said communication network node 15. The means 48 for determining a carrier-to-interference value is arranged to: interpolate a received coded bit information rate (RBIR) value from a first lookup table; interpolate a signal to interference plus noise rate (SINR) value using said interpolated received coded bit information rate (RBIR) value in a second lookup table; and, convert said interpolated signal to interference plus noise rate value into said carrier-to-interference value. The means 48 determining a carrier-to-interference value is further arranged to use a target block error rate (BLER) value when interpolating said received coded bit information rate (RBIR) value.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method in a user equipment of saving radio resources in a communication network system comprising a communication network node communicating with one or more user equipments on uplink and downlink data channels over a radio interface, whereby a transmission power value on said uplink data channel is determined by adding a power offset value to a pre-determined reference power value, the method comprising:
determining a carrier-to-interference (C/I) value on said uplink data channel; and
determining said power offset value based on said determined carrier-to-interference value, whereby said power offset value is determined in said user equipment instead of being received over said radio interface from said communication network node.

2. A method according to claim 1, wherein determining said carrier-to-interference value comprises:
interpolating a received coded bit information rate (RBIR) value from a first lookup table;
interpolating a signal to interference plus noise rate (SINR) value using said interpolated received coded bit information rate (RBIR) value in a second lookup table; and
converting said interpolated signal to interference plus noise rate value into said carrier-to-interference value.

3. A method according to claim 2, wherein interpolating a received coded bit information rate (RBIR) value comprises using a target block error rate (BLER) value.

4. A method according to claim 1, wherein said power offset determination further is based on a hybrid automatic repeat request (HARQ) operating point (M).

5. A method according to claim 2, wherein said interpolated signal to interference plus noise rate (SINR) value is converted to said carrier-to-interference (C/I) value by using the formula:

$$C/I = \frac{SINR}{M \cdot SF}$$

wherein SF is a spreading factor and M is a hybrid automatic repeat request (HARQ) operating point (M).

6. A method according to claim 2, wherein said power offset determination further is based on a hybrid automatic repeat request (HARQ) operating point (M).

7. A method according to claim 6, wherein said interpolated signal to interference plus noise rate (SINR) value is converted to said carrier-to-interference (C/I) value by using the formula:

$$C/I = \frac{SINR}{M \cdot SF}$$

wherein SF is a spreading factor and M is the HARQ operating point.

8. A method according to claim 7, wherein interpolating a received coded bit information rate (RBIR) value comprises using a target block error rate (BLER) value.

9. A method according to claim 1 wherein the predetermined reference power value is a predetermined reference power value of a reference control channel.

10. A user equipment configured to operate in a communication network system comprising a communication network node communicating with one or more user equipments on uplink and downlink data channels over a radio interface, whereby a transmission power value on said uplink data channel is determined by adding a power offset value to a predetermined reference power value, wherein the arrangement comprises:
means for determining a carrier-to-interference (C/I) value on said uplink data channel; and
means for determining said power offset value based on said determined carrier-to-interference value, whereby said power offset value is determined in said user equipment instead of being received over said radio interface from said communication network node.

11. A user equipment according to claim 10, wherein said means for determining a carrier-to-interference value is arranged to:
interpolate a received coded bit information rate (RBIR) value from a first lookup table;
interpolate a signal to interference plus noise rate (SINR) value using said interpolated received coded bit information rate (RBIR) value in a second lookup table; and convert said interpolated signal to interference plus noise rate value into said carrier-to-interference value.

12. A user equipment according to claim 11, wherein said means for determining a carrier-to-interference value is further arranged to use a target block error rate (BLER) value when interpolating said received coded bit information rate (RBIR) value.

13. A user equipment according to claim 10, wherein said means for determining a power offset value is arranged to determine said power offset value based on a hybrid automatic repeat request (HARQ) operating point (M).

14. A user equipment according to claim 11, wherein said means for determining a carrier-to-interference (C/I) value is arranged to convert said interpolated signal to interference plus noise rate (SINR) value to said carrier-to-interference (C/I) value by using the formula:

$$C/I = \frac{SINR}{M \cdot SF}$$

wherein SF is a spreading factor and M is a hybrid automatic repeat request (HARQ) operating point (M).

15. A user equipment according to claim 11, wherein said means for determining a power offset value is arranged to determine said power offset value based on a hybrid automatic repeat request (HARQ) operating point (M).

16. A user equipment according to claim 15, wherein said means for determining a carrier-to-interference (C/I) value is arranged to convert said interpolated signal to interference plus noise rate (SINR) value to said carrier-to-interference (C/I) value by using the formula:

$$C/I = \frac{SINR}{M \cdot SF}$$

wherein SF is a spreading factor and M is the HARQ operating point.

17. A user equipment according to claim 16, wherein said means for determining a carrier-to-interference value is further arranged to use a target block error rate (BLER) value when interpolating said received coded bit information rate (RBIR) value.

18. A user equipment according to claim 10 wherein the predetermined reference power value is a predetermined reference power value of a reference control channel.

19. A method in a user equipment of saving radio resources in a communication network system comprising a communication network node communicating with one or more user equipments on uplink and downlink data channels over a radio interface, the method comprising:
 determining a carrier-to-interference (C/I) value on said uplink data channel;
 determining a power offset value based on said determined carrier-to-interference value, whereby said power offset value is determined in said user equipment instead of being received over said radio interface from said communication network node; and
 determining a transmission power value on said uplink data channel by adding said power offset value to a predetermined reference power value.

20. A method according to claim 19 wherein the predetermined reference power value is a predetermined reference power value of a reference control channel.

21. A method according to claim 20, wherein determining said carrier-to-interference value comprises:
 interpolating a received coded bit information rate (RBIR) value from a first lookup table;
 interpolating a signal to interference plus noise rate (SINR) value using said interpolated received coded bit information rate (RBIR) value in a second lookup table; and
 converting said interpolated signal to interference plus noise rate value into said carrier-to-interference value.

22. A method according to claim 21, wherein interpolating a received coded bit information rate (RBIR) value comprises using a target block error rate (BLER) value.

23. A method according to claim 21, wherein said interpolated signal to interference plus noise rate (SINR) value is converted to said carrier-to-interference (C/I) value by using the formula:

$$C/I = \frac{SINR}{M \cdot SF}$$

wherein SF is a spreading factor and M is a hybrid automatic repeat request (HARQ) operating point (M).

24. A method according to claim 23, wherein said power offset determination further is based on the HARQ operating point (M).

* * * * *